United States Patent [19]

Birkbeck et al.

[11] 4,043,299
[45] Aug. 23, 1977

[54] FISH REARING SYSTEM

[75] Inventors: Alexander E. Birkbeck, Delta; Craig C. Walden, Vancouver, both of Canada

[73] Assignee: British Columbia Research Council, Vancouver, Canada

[21] Appl. No.: 573,548

[22] Filed: May 1, 1975

[51] Int. Cl.² .............................................. A01K 63/00
[52] U.S. Cl. ......................................... 119/3; 210/169
[58] Field of Search ............... 210/169, 194, 195, 196, 210/198, 200, 205; 119/3

[56] References Cited

U.S. PATENT DOCUMENTS

| | | | |
|---|---|---|---|
| 3,116,712 | 1/1964 | Ogden et al. | 210/169 UX |
| 3,545,619 | 12/1970 | Ettlich | 210/196 |
| 3,550,774 | 12/1970 | Hirs | 210/195 |
| 3,617,539 | 11/1971 | Grutsch | 210/196 |
| 3,713,543 | 1/1973 | Heaney | 210/196 |
| 3,748,262 | 7/1973 | Lee et al. | 210/194 |
| 3,756,197 | 9/1973 | Buss | 119/3 |
| 3,773,660 | 11/1973 | Hopwood | 210/196 |
| 3,842,804 | 10/1974 | Christensen et al. | 119/3 |
| 3,856,671 | 12/1974 | Lee et al. | 210/194 |
| 3,886,902 | 6/1975 | Haynes | 119/3 |
| 3,888,210 | 6/1975 | Buss | 119/3 |

Primary Examiner—Theodore A. Granger
Attorney, Agent, or Firm—Larson, Taylor and Hinds

[57] ABSTRACT

A fish rearing system. Water is recycled from a fish rearing tank to a primary filter. Ammoniacal nitrogen load is reduced by rapid removal of nitrogenous solids. The water is formed through a biological filter containing a particulate medium of small particle size. Prior removal of solids prevents filter blockage. The filter is provided with backwash means that include an air scour. The water is reaerated after the filter and returned to the fish rearing tank.

12 Claims, 3 Drawing Figures

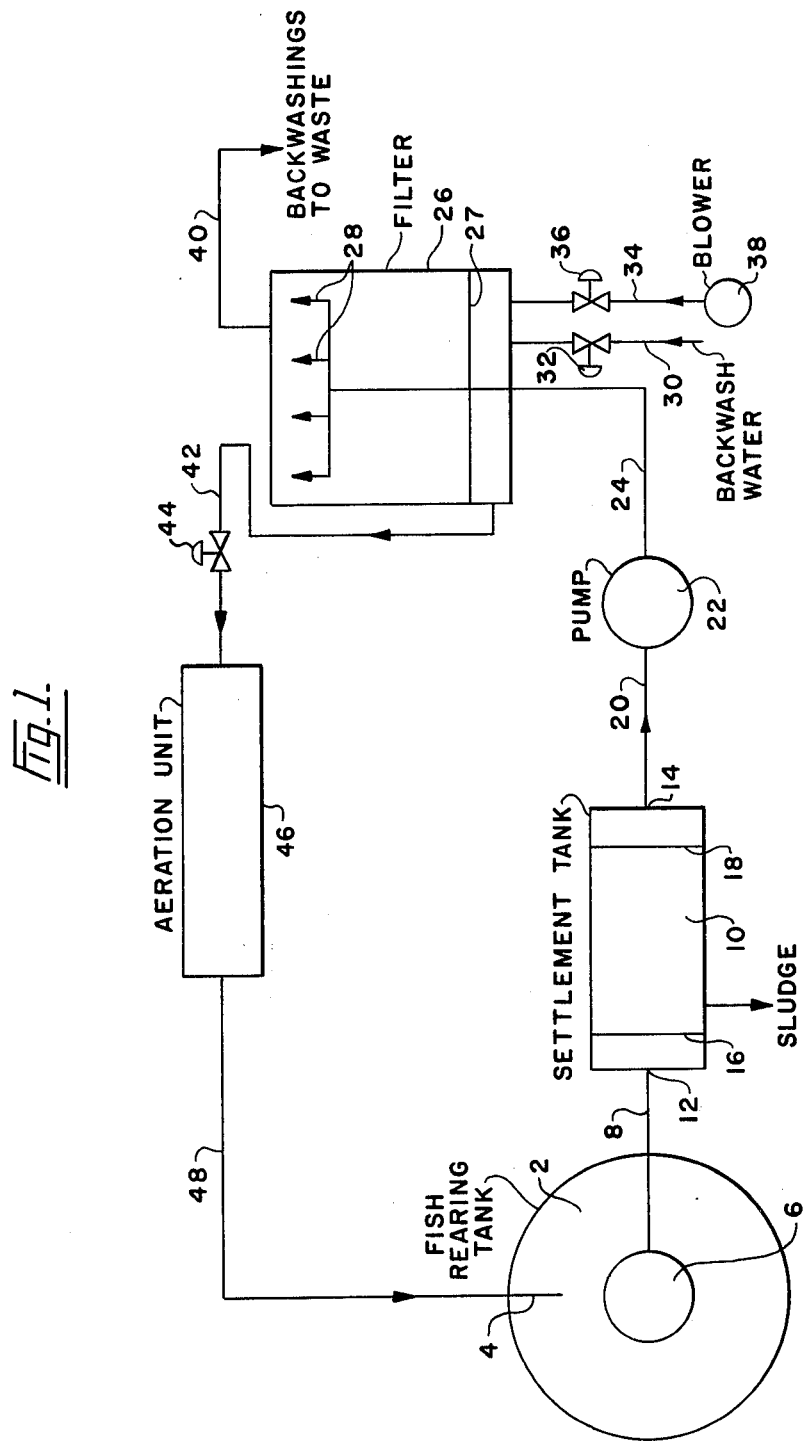

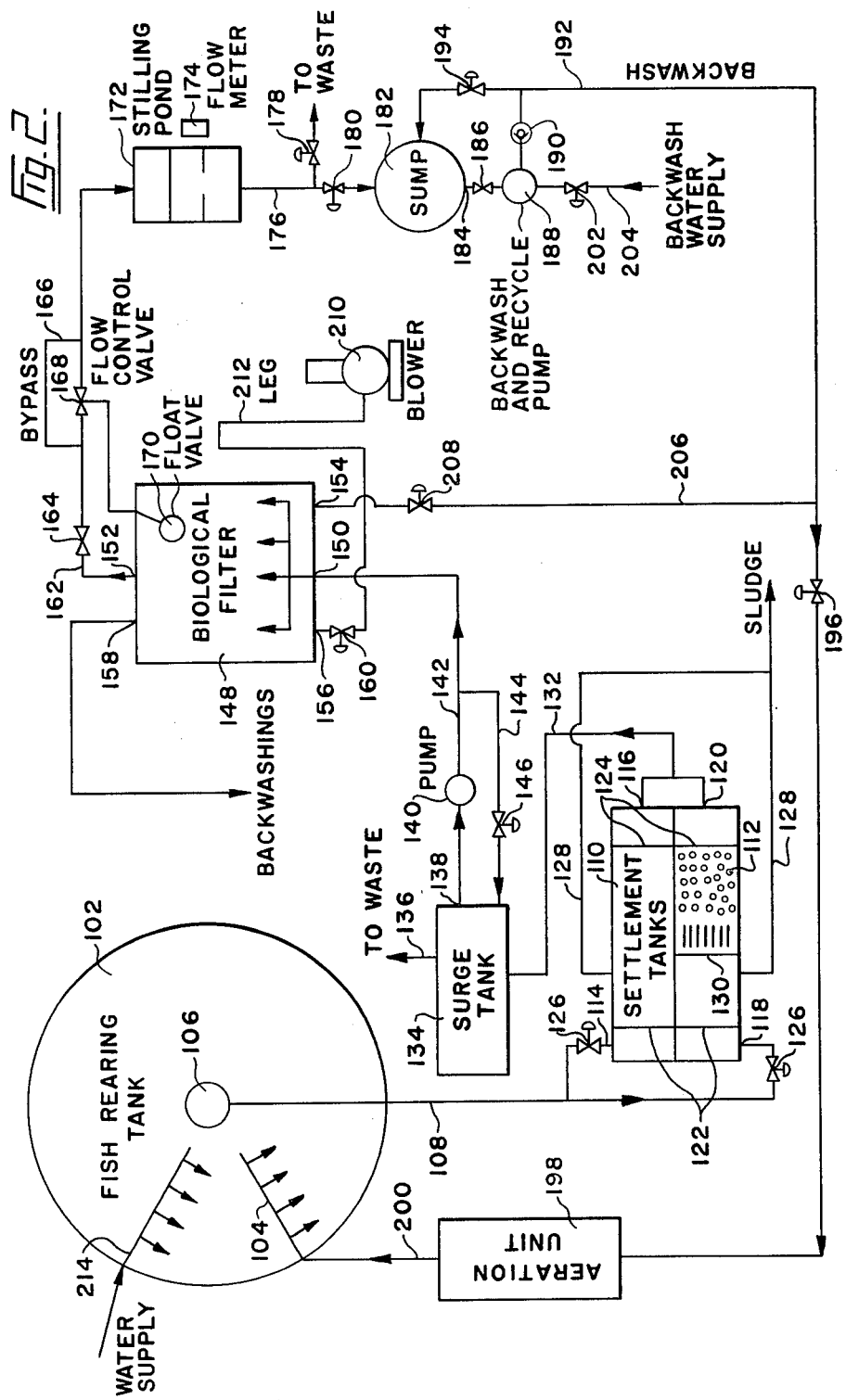

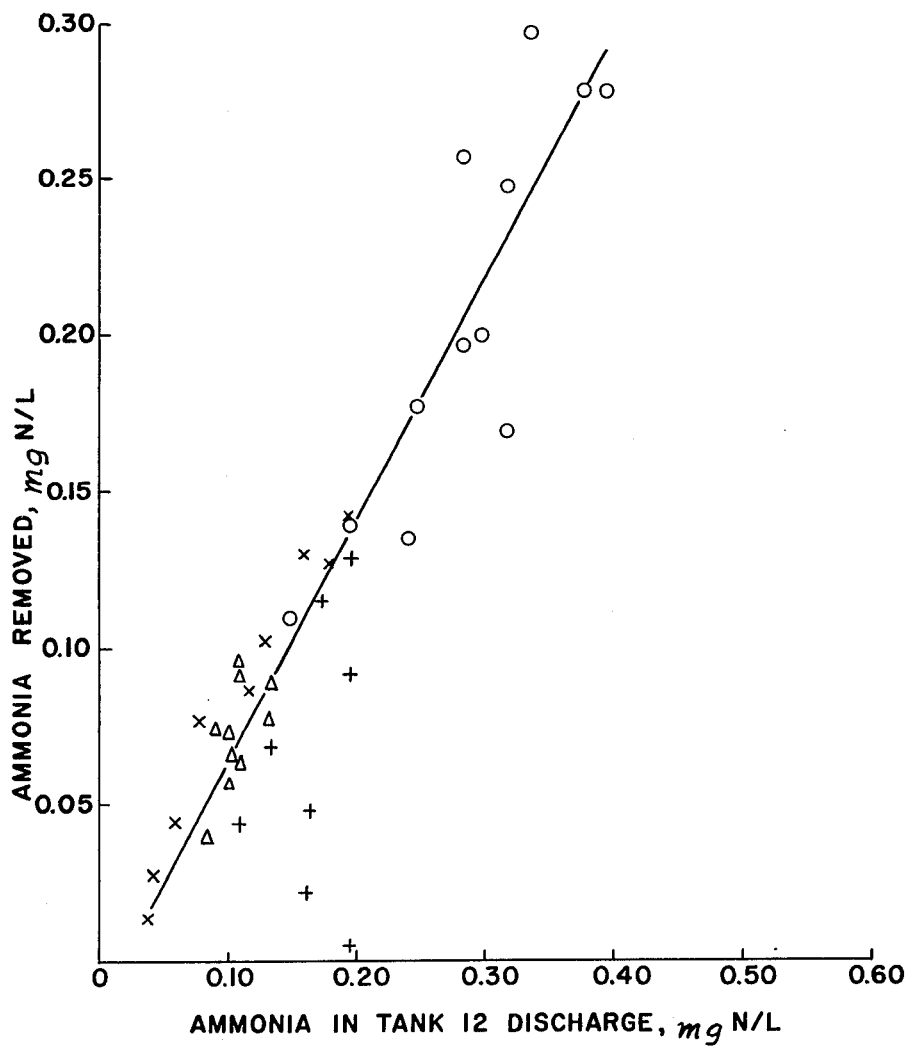

FISH REARING SYSTEM

BACKGROUND OF THE INVENTION

1. Field of the Invention

This invention relates to a fish rearing system and, more particularly to such a system including a primary filtration means and a biological filter in which effluent water from a fish rearing tank can be treated and reused in the rearing tank.

2. Description of the Prior Art

There is an increasing demand for sport and commercial fishes. This demand can only be satisfied by means of hatcheries of similar operations. These fish rearing systems require large amounts of water to operate on an appropriately large scale. Waters have normally been drawn from rivers or lakes. Such waters may vary rapidly in quality and thus endanger fish stocks.

Reuse or recycling of water is becoming increasingly desirable because there is a diminishing water supply of suitable quality; the risks to fish stocks occur due to the use of low quality water, variations in flow rate, solid content and disease levels. In addition pollution abatement costs are high for single pass systems.

In theory at least, reuse and recycling of water can provide; a substantial reduction in water requirements; optimization of fish growth rate by regulation of the water temperatures; control of disease by sterilization of intake water; and reduction of overall water supply and pollution abatement costs.

The essential requirements of a water reconditioning system for a fish rearing system must include means to control the level of suspended solids such as fish feces and unused fish food, and ammonia and carbon dioxide. Furthermore water must be returned to the fish rearing tank of the system with sufficient dissolved oxygen for fish respiration.

Burrows et al in the Progressive Fish Culturist, 30: 123 to 136, 1968 described the use of a downflow flooded filter consisting of a four foot layer of half inch to three inch rock covered with a one foot layer of one quarter to three quarter inch oyster shells. Unsettled hatchery effluent was applied at 0.83 gallons per minute per square foot of filter area. This unit has found practical application at the Dworshak Fish Hatchery in Oregon and has been installed by the Canadian Fisheries Service at the Capilano Hatchery in North Vancouver. However oyster shells were omitted from the latter application. Extensive operational problems have been encountered at Dworshak. These have been due principally to the blinding of the filters, to algae growth and to poor flow maintenance.

In technical Report No. 67, New Mexico State University, 1970, 119 pp. Gigger et al described the use of filters consisting of three quarter inch gravel or plastic media available under the trade mark SURFPAC in a semi-pilot scale test with six inch rainbow trout as the test species. Flow rate ranged from 3.5 to 5.34 gallons per minute per square foot and bed volumes were replaced at 1,39 to 4.19 minute intervals. The filter removed 150 to 200 mg. of ammonia nitrogen per hour per cubic foot of media. However the exposure time of fish in these tests was too short to assess long time ammonia toxicity effects. Furthermore no nitrite measurements were made on the test unit.

McCrimmon et al in the Progressive Fish Culturist 28: 165 to 170, 1966 described a laboratory scale water recirculation unit for holding trout. The unit involves sand filtration and carbon contacting of the recirculated water. Scott et al in Journal of the Fisheries Research Board of Canada 29: 1071 to 1074, 1974 shows that hatchery rearing water could be recycled by filtering through a two stage high rate filtration system using large particle anthracite coal. In their experiments the fish grew rapidly with negligible mortality. pH was maintained in the range of 6.5 to 7.5 but ammonia levels fluctuated widely in the range 4 to 22 milligrams of ammonia nitrogen per liter. Problems were also encountered with backwashing the filter.

Mayo et al, in "A Study for Development of Fish Hatchery Water Treatment Systems" prepared for Walla Walla District Corps of Engineers in co-operation with the U.S. Department of the Interior, U.S. Bureau of Sports, Fisheries and Wildlife, by Kramer, Chin and Mayo, Seatlle, 1972, 42 pp., compared biological filter systems using one inch and three and one half inch Koch rings and one quarter inch foamed polystyrene (stryofoam) pellets as his filter medium. The systems were compared with biological systems designed on the activated sludge tank technique. The tests showed that all systems — biological filter or activated slude —could be used for pollution control abatement but filter systems were more reliable when water reuse was a primary objective. Problems with nitrite toxicity occurred but these could be avoided by using controlled programs of management which would allow gradual increase in the fish load, thereby limiting the level of nitrite produced in the system.

SUMMARY OF THE INVENTION

The present invention has as its object to avoid the above disadvantages by providing a fish rearing system in which the fish rearing tank communicates with a primary filtration means to which water from the fish rearing tank is directed. The primary filtration is to remove particulate material rapidly. After the primary filtration means, the water passes to a biological filter of a particulate medium. This biological filter has abackwash means that includes an air blower whereby, during backwash, the filter medium is moved vigorously. In normal operation, that is when water is recycling, the water passes from the biological filter to an aeration unit where it is aerated and passed back to the rearing tank. During backwashing the water used in the backwashing is directed to waste. The system includes pump means to move water throughout the system and conduit means whereby water can be fed throughout the system.

The primary filtration means may be any filtration means able to remove a substantial proportion of particulate matter coming from the fish tank with low retention time of the water in the filtration means and, what is especially important, without blinding, that is blocking, of the filtration means. In general the primary filtration means should be able to remove up to 60% of the solids from the fish tank water in a dwell time in the filtration means of up to about 15 minutes. However, more specific comments concerning useful embodiments will be made below.

In a preferred embodiment the particulate medium of the biological filter comprises particles having a size in the range of 0.5 to 10 millimeters. Appropriate media include sand, granite, anthracite, glass beads or plastic beads having the above size. Typically a filter medium depth of about 30 inches has proved useful.

Aspects of the invention are illustrated, by way of example, in the accompanying drawings, in which:

FIG. 1 is a schematic representation of the principal features of one embodiment of the present invention;

FIG. 2 is a schematic representation of an apparatus that has been used in fish rearing trials, and FIG. 3 is a graph setting out results showing the removal of ammonia using the apparatus of FIG. 2.

DESCRIPTION OF PREFERRED EMBODIMENTS

FIG. 1 shows a fish rearing system comprising a fish rearing tank 2 having a recycled water inlet 4 and an outlet 6. Water moves along a conduit 8 to a settlement tank 10. The settlement tank 10 has an inlet 12 and an outlet 14. A weir 16 is provided adjacent to inlet 12, a weir 18 is provided adjacent to outlet 14. The weir 16 is not essential. Settlement tank 10 has a sludge outlet. From the outlet 14 water passes through conduit 20 to a pump 22. The pump 22 forces the water through conduit 24 to biological filter 26, which is shown in elevational section. The filter has a perforated, false floor 27. The water is forced into the filter through a plurality of inlets 28 above the false floor 27. A single inlet can be sufficient. The biological filter contains a particulate medium (not shown) supported on false floor 27 and is provided with backwash means comprising conduit 30 containing valve 32 and conduit 34 containing valve 36. The backwash means feed into the filter below false floor 27. A blower 38 is used to force air through the conduit 34. Similarly backwash water is forced through the conduit 30 by means not shown.

Biological filter 26 has a backwashings outlet 40 above false floor 27 and a recycled water outlet leading to conduit 42 below false floor 27. Outlet 42 has a valve 44. Conduit 42 leads to an aeration unit 46. Water passes from the aeration unit 46 to conduit 48 and hence back to the recycled water inlet 4 of the first rearing tank 2.

In use fish are reared in the tank 2 and the effluent water passes to the settlement tank 10. Settlement tank 10 is conventional in design and relatively large solids, such as feces and unused food are settled out principally in the central compartment. These solids are passed from the system as sludge. The water is then pumped by pump 22 through the biological filter 26. The principle function of the biological filter unit is to oxidize toxic ammonia nitrogen originating from fish food, urine and feces, accumulated in the system due to the recycling, into the nontoxic nitrate form. In addition suspended inpurities, and other, essentially small impurities, are removed here.

From the biological filter water passes through conduit 42 and valve 44 to aeration unit 46. The aeration unit 46 resupplies oxygen to the water and, simultaneously, strips carbon dioxide from the water. Any aeration means may be used in the system of the present invention. These means include a cascade tower, cascading the filtered discharge down an open channel with turbulent flow induced by slats spaced at intervals across the floor of the channel; diffused air, Venturi injection and spray nozzles.

The rearated water is then able to support fish life and is returned to the fish rearing tank 2.

The biological filter 26 must be backwashed periodically to remove accumulated solids. In order to backwash the filter, pump 22 is stopped, valve 44 is closed and valves 32 and 36 in conduits 30 and 34 are opened. Backwash water is then fed forced by means of a pump through conduit 30 and in an upwards direction through the biological filter 26. Blower 38 is started and blows compressed air through conduit 34 and upwards through the biological filter. The air and water must be balanced in a manner that lifts and expands the bed causing violent agitation of the particles, which scours off agglomerated particulate matter. As an alternative the air and water may be applied in alternating surges to achieve the same objective. The backwashings are forced out through conduit 40. After the appropriate length of time the backwash water supply is stopped. Blower 38 is switched off. Valves 32 and 36 are closed and valve 44 is opened. Pump 22 is then started and the system continues to recycle water back to the fish rearing tank 2.

It should be emphasized that the function of the settlement tank 10 is to remove rapidly and substantial porportion of the particulate matter from the water coming from the fish tank 2. It must be able to remove the particulate matter with only low retention time of the water in the tank 10. The tank 10 may then be replaced by any filtration means able to remove a substantial proportion, for example, up to 60%, of the particulate matter in the water from fish tank 2 with low retention time, preferably not greater than 20 minutes, and without blinding. Other filter means that can be used include (a) stationary screen without backwash including sloped and horizontal screens (b) rotating screens, and (c) stationary screens with backwashing. All these types of filters are known in the filtration art.

a. Stationary screens without backwash provide an effective rough filtration of liquids by means of curved, sloped or horizontal screens made from wedge wire, metal or cloth mesh media. They are usually maintained in a clear state by splitting the flow in two directions. Increased performance may be obtained by vibrating the filter media.

b. Rotating screens are generally horizontal rotating drums. The periphery of the drum is a filter medium formed from wedge wire or fabric. The drum is partially submerged. Debris-loaded liquid enters an open end of the drum and passes outwardly through the filter medium. The solids caught on the sides of the drum are usually continually removed by jets of backwash water—usually water filtered through the drum—applied along the length of the outer surface of the drum at a point where it is not submerged. The backwash water passes from the inside of the drum via the drum axle.

c. Stationary screens with backwashing consist of one or more angle filter elements valved in parallel with common inlet, outlet and blow off headers. Each filter of a unit is a plurality of filters which can be backwashed independently by flow reversal through the filter element. The filter elements may be wire wound, perforated, slotted or woven from metal or fabric. Generally the elements can be changed readily. The use of such a unit is described below in setting out the results obtained with the apparatus shown in FIG. 2.

FIG. 1 illustrates the essentials of an embodiment of the present invention. A practical embodiment of the invention that has been used in achieving excellent results is shown in FIG. 2 of the drawings.

FIG. 2 is a diagrammatic plan of a fish rearing system. The system comprises a fish rearing tank 102 having a recycled water inlet 104 and an outlet 106. Effluent from the tank 102 passes through the outlet 106 to conduit 108 to a pair of settlement tanks 110 and 112. Tank 110 has an inlet 114 and an outlet 116. Tank 112 has an inlet 118 and an outlet 120. In each tank weir 122 is positioned adjacent the inlet and a weir 124 is positioned adjacent the outlet. Flow into the settlement tanks 110 and 112 is controlled by valves 126. Conduits 128 remove sludge from the settlement tanks 110 and 112.

Settlement tank 110 is illustrated as a simple horizontal flow settlement tank. Settlement tank 112 is a tube settlement unit constructed from tubes placed at an angle of, for example, 60° below the horizontal and extending the full width of the tank 112 from outlet weir 124 to approximately half way along the tank 112. A baffle 130 is placed between the tubes and the input weir 122. The baffle causes liquid to pass through the tubes to the discharge end of the settlement tank 112. It should be noted that the tubes may be replaced by inclined plates, as known in the art. Further the tubes or plates need not extend approximately half-way along tank 112. They may extend part or all of the way from the outlet weir to the inlet end of tank 112.

From the settlement tanks water passes through conduit 132 to a surge tank 134. The surge tank 134 has a waste outlet 136 and an outlet 138 for recycled water. From outlet 138 water passes to a pump 140. Pump 140 pumps water into a conduit 142 where it passed either to conduit 144 through valve 146 and back to the surge tank 134 or, in the main, to biological filter 148.

Biological filter 148 comprises a container having a perforated false floor (not shown, but as in FIG. 1), and inlet 150 for recycled water above the false floor and an outlet 152 for recycled water below the false floor. there is an inlet 154 for backwash water and an inlet 156 for back air both below the flase floor. The filter has an outlet 158 for backwashings above the false floor. A valve 160 provides positive protection to the backwash air pump when the latter is not operating—this is discussed below. A particulate filter medium, not shown, is positioned on the false floor. The particulate medium has a size in the range 0.5 to 10 millimeters.

From outlet 152 recycled water is fed into conduit 162 containing a valve 164. A bypass 166 and a flow control valve 168 are arranged in conduit 162. These, in conjunction with a float valve 170, control the level of liquid in the biological filter 148. Water from conduit 162 enters a wire box 172. The weir box 172 has associated with it a flow meter 174. Water passes from the weir box 172 to a conduit 176 and may be passed to waste through a valve 178. From waste the water may be dumped or disposed of during start-up procedures. However, usually the water passes through a valve 180 to a sump 182. Water passes from the sump 182 into a conduit 184 through a valve 186 to a backwash and recycle pump 188. In usual operation, that is, when water is recycling towards the fish rearing tank 102, water is pumped from pump 188 through non-return valve 190 into conduit 192. Flow can be regulated by a valve 192 permitting the passage of water back to the sump 182.

Water passes through conduit 192, through valve 196 to aeration unit 198. From here the water passes through conduit 200 to the recycled water inlet 104 of fish rearing tank 102. Typically the aeration unit may be, for example a cascade tower but any known aeration system may be used as discussed above with regard to FIG. 1.

In the embodiments of the invention illustrated in FIG. 2 the pump 188 is used to recycle water in the system and is also used to force backwash water through the biological filter 148. The illustrated apparatus must be backwashed regularly, for example, once a day. To enable backwashing the valves 194 and 196 in conduit 192 are closed and valves 164 and 186 are closed. By the closing of valve 196 water in conduit 192 is diverted into a conduit 206 that leads through a valve 208 into inlet 154 of filter 148. A valve 202 in a conduit 204 connected to a backwash water supply is opened. Valve 208 in conduit 206 is opened. Backwash water is then forced from pump 188 through non-return valve 190 to conduit 192. A blower 210 is started and blows air through leg 212, through valve 160 and through the air inlet 156 of biological filter 148. The air is discharged through the perforated false floor of the filter unit and through the filter media via a multiplicity of diffuser nozzles (not shown). As a result the filter medium is violently agitated by the air and washed by the backwash water. The agitation greatly facilitates the washing. Backwashings pass through outlet 158 to waste.

When sufficient backwashing has been carried out valves 202, 208 and 160 are closed and valves 196 164 and 186 are opened. The system then operates by recycling water back to the fish rearing tank 102.

Fresh water may be added to the system through inlet 214 in fish rearing tank 102.

Fish rearing tank 102 may be any fish rearing tank known in the art. Desirably the pond will be self cleaning, provided with an automatic feed device and have means for controlling the level of the water in the tank.

Settlement tanks 102 and 112 are to remove from the system larger solids such as feces and unused food. Their rapid removal of solids reduces the total load of solids, organic material and ammonia arriving at filter 148. The overall need of oxidation is minimized by removal of particulate organic matter, especially that material containing nitrogenous matter. The removal at an early stage prevents the possibility of the material being converted into a soluble form.

Surge tank 134 is fitted with high and low level sensors and its function is to provide automatic control of the pump 140 delivering water to the biological filter 148. The recycle line 144 is arranged to discharge water into surge tank 134 and thus facilitate flow balancing.

The biological filter removes small, suspended solids from the recycling water but it also removes toxic nitrogen compounds by converting them to nitrate by microbiological reactions taking place on the filter medium. The job of the biological filter 148 is simplified by the removal from the system of larger solids in the settlement tank 110 and 112. In particular, by removing these solids at a relatively early stage in the recycling process subsequent conversion to ammonia is reduced and control of ammonia and nitrite in the recycling system is thus facilitated.

The weir box 172 and flow meter 174 permit measurement of the flow in the system. Weir box 172 is fitted with a weir (not shown) for flow measurement. The weir can be calibrated theoretically or simply be measuring the time to fill sump 182 for different flow rates when pump 188 is inoperative. Measurement of flow passing around the recycle unit can be recorded at the weir using a Stevens and Leopold chart recorder. However the mode and position of flow measurement is restricted to the illustrated apparatus. Any proprietary equipment may be useful. This includes flume, notch, "measure-L" and propeller meter measuring means. Indeed flow measurement is not essential to the operation of the system of the invention as it is only required to aid flow control. Careful selection of pumping units can achieve the same objectives and maintain flow rates within the required limits.

The backwash and recycle pump 188 provides the means of forcing water through a pre-selected path. A centrifugal pump has proved useful.

Aeration unit 198 functions to add oxygen to the water and to strip carbon dioxide from the water. Any aeration unit able to carry out this task is suitable in the apparatus. A cascade type in which water is fed down an open channel may be used. Turbulent flow can be created by two inch high slats placed at intervals across the flow of the channel. However the aeration unit 198 may also be varied out as described above for aeration unit 46 illustrated in FIG. 1.

The aeration unit need not be at the position shown in FIG. 2. It may be at any point after the biological filter although clearly it is desirable to place it as close as possible to the inlet 104 of the fish rearing tank 102.

Blower 210 used in the backwash cycle of the system of the present invention may be, for example, a blower fitted with a five horsepower motor with a variable speed drive. Leg 212 and valve 160 are present to prevent backflow of water into the blower. Only one is necessary but both may be incorporated as a safety factor. The leg 212 may be replaced by a oneway valve.

Settlement tanks 110 and 112 are essentially short retention period units. Any commercially available equipment capable of removing up to 60% of the suspended particular matter, including settlement tanks, detritus handling equipment or any form of continuously cleaned screen, may be used. Preferably the removal should be achieved in up to about 15 minutes. In this matter see the remarks above concerning primary filtration in the description of FIG. 1.

The biological filter unit 148 can consist of a layer, preferably approximately 30 inches deep, having particules of, for example, sand, granite or anthracite or plastic beads with a particle size of 0.5 to 10 millimeters, preferably 1 millimeter to 10 millimeters. The applied water flow rate is in the order of 2.5 Imperial gallons per square foot per minute or better which is greater than the flow rates used previously in filters used in fish rearing system. The filter may operate with upwards or downwards flow. Water backwashing is carried out by forcing water against the normal recycling flow direction or with upwards flow, by increasing the rate of flow to expand the bed.

The illustrated embodiments of FIGS. 1 and 2 may be varied by including a heating coil or a cooling coil, depending upon where the apparatus is to be used. Generally speaking no cooling system need be incorporated into the system as some cooling effect will be obtained by the aeration unit, especially when the aeration unit is a cascade unit. However, cooling may still be necessary in very high ambient temperatures. Similarly, at cold ambient temperatures the system may be fitted with heat exchange units. In FIG. 2 such heat exchange units are preferably disposed between the settlement tanks 110 and 1112 and the surge tank 134. The point of installation is not critical but at this point the oxygen level is probably low and the corrosion of the heating coils is thus reduced to a minimum. Useful heating and cooling units are those available for the art.

In operation water is fed to the fish rearing tank 102 either directly from supply or it may be reclaimed from an egg hatching process. It may or may not be sterilized prior to feeding into the fish rearing tank 102. In the illustrated embodiment fresh water is fed through inlet 214, but, in fact, any convenient point in the system may be adopted. However, the most suitable point is prior to aeration as this maximizes the fish carrying capacity of the system. The level of the water in the tank is controlled, typically at about two and one half feet, by a leg in the conduit 108.

A series of trials were carried out using the apparatus illustrated is FIG. 2 of the drawings with 90% recycle. The fish rearing tank 102 was a circular, self-cleaning fish rearing pond 16 feed in diameter and 4 feet deep. The level of water in the pond was maintained at 2 feet 6 inches by a leg in conduit 108. The water supply was from a well. The pond was fitted with an automatic feeding device. Two settlement tanks were placed in the system. Each was 8 feet long and 4 feet deep and approximately 2 feed wide. The capacity of each tank was 210 gallons. Tank 110 was a simple horizontal flow settlement tank. Settlement tank 112 was fitted with a tube settler unit constructed from one and a half inch diameter tubes placed at an angle 60° below horizontal and extending the full width of the tank from the outflow weir 124 to a line half way along the unit. Baffle 130 was placed between the tubes and the input end causing liquid to pass through the tubes to the discharge end. Six inches of free board was allowed above the tube bank.

These tanks provide liquid retention time between about 8 and 15 minutes and the upflow and weir overflow rates are of the order of approximately 3,360 Imperial Gallons per square foot per day and 20,160 gallons per linear foot per day respectively. The settlement tanks may be fitted with scraping devices and ideally will be fitted for optimum sludge removal A sand filter was constructed from marine plywood. The filter was five foot square and five foot deep and was fitted with a false floor 18 inches from the base. 120 Polyvinylchloride air diffuser nozzles were fitted into the false floor. Flanges were arranged in the filter wall beneath the false floor to accomodate water inlet 150, backwash water inlet 154 and air inlet 156. The backwashings were directed over a weir for flow measurement. The filter unit was set onto a concrete pad adjacent the fish rearing tank 102. The gravity and filter was equipped with a Clayton-type valve 168 fitted in to a by-pass so that the valve controlled a portion of the flow. Surge tank 134 used in the experimental system was constructed from marine plywood. It was fitted with a high and low level sensor to provide automatic control of the pump 140.

A plywood stilling pond was constructed and fitted with a weir for flow measurement. A Stevens and Leopold chart recorder was used to record the flow. Pump 188 was a centrifugal pump. Air scour was provided by a blower driven by a five horsepower motor with a variable speed drive. The aeration unit was an open channel down which the water cascaded. Turbulent flow was created by two inch high slats placed at intervals across the floor of the channel. The water inlets 104 and 214 in fish rearing tank 102 were disposed at an angle. This angle could be varied to control circular flow patterns in the fish rearing tank 102.

In a test operation commencing on July 31, 1973, 10 lb. of rainbow trout of a size b 2,300 fish per lb., were placed in the test rearing pond. The fish were fed at a rate of 2 lb pelletized fish food per day and they increased in size until there were 35.3 lb of fish in the system (620 per lb.). Mortalities during this period were 1,134, or an average of 38 per day. On September 5, a further 27,200 trout were added, the fish averaging 800 fish/lg. There were now a total of 49,066 fish in the system. Feeding continued with dry food according to standard fish hatchery practice. The weight of fish increased from 120 lb. on September 15, to 249 lb. on October 31. The mortality rate over this time interval declined to approximately 13 per day, in spite of the increase in numbers (Table 1). On December 3, 6.5 lb of fish were removed, leaving 297.6 lb. in the tank at 155 fish per lb. Those remaining increased in size until Jan. 31, 1974, when there were 483.5 lb of fish in the system, at an average of 95 fish per lb. The mortality rate between November 6 and January 31 was 3 to 4 fish per day. Total mortalities for the period September 5 to January 31 were 2,136 fish. The mean flow rate through the system was 62 gpm, and the fish loading on January 31, was 7.8 lb of fish per gpm.

Data collected showed that the system operated for better than five months at a flow rate of 88,900 ± 4,200 gpd. The mean flow rate was 62 +/− 3 gpm. The normal volume backwash was 580 gpd. until the third week of November, when the volume doubled. Make up water was added at 3.65 gpm, which was equivalent to 5.6% of the recycle flow,. These data show that mechanically the system operated very well. The water temperature was in the range of 10° to 14° C and dissolved oxygen never dropped below 7.0 mg/liter. The pH in the fish rearing tank remained in the range of 6.9 to 7.3, as did the pH of the recycle water, confirming that the pH did not drop while the effluent passed through the gravity sand filter.

TABLE I

FISH LOAD, SIZE, AND MORTALITIES IN REARING POND RECYCLE PILOT PLANT

July 1973 – January 1974

| Date 1973-1974 | Load (lb) | Size (Number/lb) | Number | Fish Mortalities Total | Daily Mean |
|---|---|---|---|---|---|
| July 31 | 10.0 | 2,300 | 23,000 | | |
| July 31 – Aug. 15 | 21.4 | 1,104 | 22,468 | 532 | 33.3 |
| Aug. 16 – Aug. 31 | 35.3 | 620 | 21,866 | 602 | 37.6 |
| Sept. 5[1] | | | 49,066 | | |
| Sept. 1 – Sept. 15 | 119.9 | 440 | 48,356 | 710 | 47.3 |
| Sept. 16 – Sept. 30 | 149.6 | 320 | 47,881 | 475 | 31.7 |
| Oct. 1 – Oct. 15 | 190.4 | 250 | 47,600 | 280 | 18.7 |
| Oct. 16 – Oct. 31 | 24.5 | 190 | 47,400 | 200 | 12.5 |
| Nov. 1 – Nov. 15 | 286.1 | 165 | 47,200 | 200 | 13.3 |
| Nov. 16 – Dec. 2 | 304.1 | 155 | 47,140 | 60 | 3.5 |
| Dec. 3[2] | | 155 | 46,140 | | |
| Dec. 3 – Dec. 15 | 365.8 | 126 | 46,090 | 50 | 4.2 |
| Dec. 16 – Jan. 1 | 393.4 | 117 | 46,030 | 60 | 3.8 |
| Jan. 2 – Jan. 15 | 403.4 | 114 | 45,990 | 40 | 3.1 |
| Jan. 16 – Jan. 31 | 483.5 | 95 | 45,930 | 60 | 3.8 |

[1] 34 lb of fish at 800 fish per lb added (27,200 fish)
[2] 6.6 lb of fish at 155 fish per lb removed (1,000 fish)

Data presented in Table 2 shows the water quality of test samples taken from the recycle unit during the test period described above. In the Table:

Total Kjeldahl Nitrogen is a measure of the organically bound and ammonia nitrogen;

Ammonia is a measure of ammonia nitrogen existing as a salt or as free gas;

Nitrite is a measure of the nitrogen existing in the partially oxidized ionic form $NO_2$;

Turbidity is a measure of the liquid clarity. It is expressed in Jackson turbidity units (JTU);

Suspended solids refer to discrete particulate matter of a size that may be strained from the liquid on a filter of 0.45 micron pore size;

$BOD_5$ is the five day biochemical oxygen demand, a measure of the oxygen requirement of the liquid due to respiration of micro organisms suspended in or added to the liquid. It is expressed as mg oxygen/liter.

TABLE 2

WATER QUALITY IN REARING POND RECYCLE PILOT PLANT*

JULY 1973 – JANUARY 1974

| Date 1973-1974 | Total Kjeldahl Nitrogen (mg N/l) | Ammonia (mg N/l) | Nitrite (mg N/l) | Turbidity (JTU) | Suspended Solids (mg/l) | $BOD_5$ (mg/l) |
|---|---|---|---|---|---|---|
| July 31 Tank 12 | 0.34 | 0.015 | 0.029 | 0.7 | 1.7 | 7 |
| Recycle + | | | | | | |
| August 14 Tank 12 | 0.52 | 0.038 | 0.030 | 0.4 | 1.9 | 6 |
| Recycle | 0.57 | 0.025 | 0.046 | 0.8 | 1.6 | 5 |
| August 21 Tank 12 | 0.44 | 0.023 | 0.020 | 0.4 | 1.6 | 6 |
| Recycle + | | | | | | 8 |
| August 29 Tank 12 | 0.72 | 0.046 | 0.018 | 0.6 | 1.2 | 9 |
| Recycle | 0.97 | 0.017 | 0.014 | 0.9 | 1.4 | 5 |
| Sept. 11 Tank 12 | 0.47 | 0.061 | 0.034 | 2.3 | 2.9 | 9 |
| Recycle | 1.05 | 0.016 | 0.032 | 2.1 | 1.1 | 6 |
| Sept. 18 Tank 12 | 0.70 | 0.077 | 0.039 | 1.5 | 3.1 | 8 |
| Recycle | 0.75 | 0.001 | 0.034 | 0.8 | 2.0 | 4 |
| Sept. 27 Tank 12 | 0.56 | 0.200 | 0.092 | 1.1 | 1.8 | 9 |
| Recycle | 0.49 | 0.057 | 0.087 | 0.6 | 1.3 | 6 |
| Oct. 9 Tank 12 | — | 0.127 | 0.041 | 1.4 | 1.9 | 10 |
| Recycle | — | 0.024 | 0.035 | 1.3 | 1.8 | 10 |
| Nov. 5 Tank 12 | — | 0.179 | 0.040 | — | 3.0 | 6 |
| Recycle | — | 0.052 | 0.052 | — | 1.9 | 8 |
| Dec. 3 Tank 12 | — | 0.160 | 0.036 | — | 2.9 | 5 |
| Recycle | — | 0.030 | 0.038 | — | 1.9 | 10 |

TABLE 2-continued
WATER QUALITY IN REARING POND RECYCLE PILOT PLANT*
JULY 1973 – JANUARY 1974

| Date 1973–1974 | Total Kjeldahl Nitrogen (mg N/l) | Ammonia (mg N/l) | Nitrite (mg N/l) | Turbidity (JTU) | Suspended Solids (mg/l) | $BOD_5$ (mg/l) |
|---|---|---|---|---|---|---|
| Jan. 10 | | | | | | |
| Tank 12 | — | 0.117 | 0.066 | — | 2.8 | — |
| Recycle | — | 0.030 | 0.068 | — | 1.7 | — |

*Based on analysis of composite sample made from 24 hourly sub-samples commencing on date noted.
+ Data not collected on indicated dates.

Removal of between 37 and 59% suspended solids was obtained on the pilot unit settling section at upflow and weir overflow rates of 3,360 gal/ft² day and 20,160 gal/ft² day respectively. These values correspond closely to settling rates calculated from laboratory data, which would achieve this degree of removal however, they exceed conventional design rates by a substantial margin.

The biological filter, filled with granite media size at 81% between 1.0 and 2.0 mm, accomodate hydraulic loads of 3,570 gal/ft²/day.

Average filter performance showed 76% conversion of applied ammonia to other nitrogen compounds. these rates are illustrated in FIG. 3.

The filter was operated satisfactorily with mean ammonia loadings up to 0.002 lb/ft³/day and during certain periods treated loadings of 0.004 lb/ft³/day.

All data were secured with a single biofilter, 30 inches deep.

COMPARISON OF DATA TO PRIOR ART

It was mentioned earlier that a most important feature of a recycle unit is control of ammonia produced by the fish or by hydrolysis of urea, dissolved, and suspended protein (unused fish food and feces). In the tests carried out by Mayo et al. three forms of biofilter were used and two forms of activated sludge units. The latter were shown to be very inefficient ffor ammonia removal, in addition high levels of toxic nitrite were encountered. the investigators did not pursue the activated sludge techniques and opted in favor of filtration systems. reasonable success was obtained using Koch rings and expanded polystyrene (styrofoam) media-19.7 to 33.8% removal of ammonia at 1.7 to 2.0 gpm/ft² flow rate. The results obtained in the gravity sand filter tests described in the present application were substantially better. Average ammonia removal was 76% at flow rates from 1.64 to 2.48 gpm/ft² and under ideal conditions 83% ammonia was removed. Nitrite, a toxic intermediate compound formed during the biological oxidation of ammonia was controlled below toxic levels.

The excellent improved performance in oxidizing ammonia is due to a combination of effects. First, the rapid and effective removal of large particulate matter prevents its breakdown to smaller particles and to soluble nitrogenous compounds. This in turn permits use of a finer media biofilter, without the blinding encounter by previous workers and with improved performance in flow-through rates, but also with enhanced ammonia conversion corresponding to the additional surface. Thus the net result is a system with a greater hydraulic capacity, as well as an improved ammonia conversion capacity. Formerly, improvme in the one operating characteristic was achieved at the expense of the other. The improvements represented by this invention are neither self evident nor do they follow directly from the prior art. This can be supported by the comparative examination of the prior art which follows:

TABLE 3
COMPARISON OF FISH REARING SYSTEMS

| Unit Type | Trickling Filter* | Upflow Filter* | Upflow Filter* | Downflow Filter+ |
|---|---|---|---|---|
| Hydraulic load gpm/ft² | 2.0 | 2.1 | 1.7 | 0.75 |
| Retention Time (hr) | | | | |
| Filter or aeration tank | 0.294 | 0.236 | 0.265 | 0.47 |
| Total system | 1.2 | 0.58 | 0.83 | 0.93 |
| Filter depth (feet) | 4 | 4 | 4 | 4 |
| Media type | Koch Rings | Koch Rings | Styrofoam | Osyter Shell & Gravel |
| Media size (inch) | 3.5 | 3.5 | 0.25 to 0.5 | 0.25 to 3.0 |
| Volume to treat 1 mgd (cu ft) | 1,390 | 1,323 | 1,635 | 3,707 |
| Ammonia removal | 30 | 19.7 | 33.8 32.2 | |
| Ammonia in contact with fish ** mg N/l | 0.1 to 1.26 | 0.13 to 2.4 | 0.17 to 2.33 | — |
| Nitrite in contact with fish ** mg N/l | 0.03 to 0.07 | 0.05 to 0.11 | 0.06 to 0.11 | — |

| Unit Type | Downflow Filter+ | Activated Sludge* | Extended Aeration* | Present Invention(-FIG. 2) |
|---|---|---|---|---|
| Hydraulic load gpm/ft² | 0.72 | — | — | 1.64 to 2.48 |
| Retention time (hr) | | | | |
| Filter or aeration tank | 0.43 | 0.37 | 1.46 | 0.1 to 0.16 |
| Total system | 1.2 | | | 1.2 to 1.7 |
| Filter depth (feet) | 4 | | | 2.5 |
| Media type | Gravel | | | Sand |
| Media size (inch) | 0.25 – 1.5 | | | 0.04 |
| Volume to treat 1 mgd (cu ft) | 3,861 | | | 701 to 1,059 |
| Ammonia removal | 20.9 | poor | poor | 76 |

TABLE 3-continued
COMPARISON OF FISH REARING SYSTEMS

| | | | | |
|---|---|---|---|---|
| Ammonia in contact with fish ** mg N/l | — | 0.18 to 2.56 | 0.03 to 3.150 | 0.015 to 0.18 |
| Nitrite in contact with fish ** mg N/l | — | 0.001 to 0.73 | 0.01 to 1.83 | 0.02 to 0.09 |

\* Mayo et al
\+ Burrows type filters
\*\* During good operation

In terms of treatment unit size the pilot unit was shown in FIG. 2 performed excellently at a hydraulic flow rate of 2.48 gpm/ft². This is better than three times the flow allowed by filters designed by Burrows (Table 3) and a 25% improvement on the trickling filter used by Mayo et al. Although it is feasible to increase the flow rate through plastic media filters as used by Mayo et al, the retention time within the unit drops accordingly and a substantial reduction in ammonia oxidation occurs, e.g. at 30 min retention and 1.5 to 2.5 gpm/ft² about 48% ammonia load can be removed, at 12 minutes retention (i.e. similar to sand unit described here) only 20% ammonia conversion is obtained. Hence, the required land area for this invention will be ½ that required for Burrows filter units and slightly less than that required for plastic media filters. Filter depth is also substantially lower than the 4 ft used by other inventigators. This makes a substantial difference in filter media requirement and depending on site design may reduce pumping costs. The units as designed by Burrows require about 3,700 cu ft media to treat a flow of 1 mgd, those of Mayo et al, require a 1,300 cu ft minimum, whereas the filter described here only requires 701 cu ft media. This reduction in volume and depth is reflectd in reduced engineering costs. The units described by Mayo et al, which are still twice the geometric size of the unit described in this application use plastic media which at present, costs $3.90 cu ft compared to an estimated $3.00 cu ft for fine granite or sand. Thus, filter media cost for a unit treating a flow of 1 mgd in the unit described here would be about $2,000 whereas plastic media similar to that used in units proposed by Mayo et al would cost $5,500, a factor of 2 ½ times. For a typical large hatchery recirculating 20 to 30 mgd the cost advantage for media alone approaches $100,000 or approximately half the total cost of the filtration system based on the system described in this application.

PRESSURE FILTRATION TESTS

Problems concerning the use of pressure filtration were described by Scott et al (1972) — see above — for pressure filters utilizing anthracite and cacite media. These investigators obtained negligible ammonia removal and ammonia levels ranged from 4.0 to 22 mg N/1 in their tests.

The system of the present invention relies upon rapid removal of excess fish food to maintain relatively low ammonia levels. Accordingly, tests were made using pressure filtration to see if effective results could be obtained despite the Scott et al work.

a. Small scale pressure filter unit

A pressure filter unit having filter element dimensions: 2 inches diameter, 12 inches long and total filter fabric area 75 sq inches was used in these tests. The unit consisted of a stainless steel tubular steel outer casing into which was fitted a centrally mounted perforated support, continuously welded to the filter outlet casting. A variety of filter elements (stainless steel fabric, stainless steel wire wound, nylon fabric etc) may be fitted over the perforated support and held in place by a flange secured by a CAM-LOK (trade mark) coupler which also secures the inlet and outlet chambers together.

b. Pressure filtration tests

Wastewater from fingerling rearing troughs was applied to the test unit by means of a multi stage pump at a flow rate of 20 gpm. Tests were carried out using 100, 150 mesh stainless steel and 150, 250 mesh nylon fabric filters. These tests showed that 47 to 56% of suspended material could be removed from waters initially containing 2 to 3 mg/1 suspended solids.

The filter unit did not block provided that wastewater application periods were maintained at about 3 minutes and the filter was backwashed with a high pressure application of clean water for 3 seconds. Backwash volumes were maintained within economical limits and ranged from 2.3 to 3.75% of the treated water.

If the application period was extended, then the filter blinded and could not be backwashed by a reverse high pressure flow of clean liquid.

In this invention, a gravity, particulate filtration unit is used for ammonia conversion although a pressure upflow system could be utilized at similar water flow rates. It is essential for continuing performance of the unit that it be fitted with facilities for air scour of the filter media.

What we claim as our invention is:

1. A fish rearing system in which water can be recycled, the system comprising the following components in combination: a tank containing fish, said tank having a water inlet and a water outlet, the outlet of said tank being in fluid communication with the inlet of a first gravitational separator tank means for the removal of large suspended debris with low retention time for the water in the separator tank means, said separator tank means having a sludge outlet, weir means spaced from said separator tank inlet means and located in an upper portion of the separator tank adjacent an outlet means for said separator tank, a second particulate media filter tank with its inlet connected to the outlet of said first separator tank and containing filter media particles in the size range of 0.5 to 10 mm. whereby biological water purification sites are provided on such particulate media, outlet means in said particulate media tank, water backwash means whereby backwash water can be forced through the particulate medium of the filter to clean the medium when required, air scour means whereby air can be forced through the particulate medium to lift and expand the medium and agitate the mediumm vigorously to permit adequate backwashing of the medium by the backwash water, pump means to move water through the filter tank, aeration means positioned between the filter tank outlet and the recycled water inlet of the fish tank whereby water in the system can be aerated and stripped of carbon dioxide, conduit means whereby water can be fed from the fish tank outlet through the other components of the system to the fish tank inlet, and means for feeding fresh water into the system.

2. A system as claimed in claim 1 in which the separator tank has inclined tubes or plates extending from the weir adjacent the outlet towards the inlet of the tank.

3. A system as claimed in claim 2 in which the separator tank has means to cause liquid to pass through the tubes or over the plates.

4. A system as claimed in claim 3 in which the means to cause liquid to pass through the tubes or over the plates to the outlet comprises a weir adjacent the inlet and a baffle between the tubes or plates and in the weir adjacent the inlet.

5. A system as claimed in claim 1 in which the filter medium has a depth of about 30 inches.

6. A system as claimed in claim 1 in which the filter medium is selected from sand, granite, anthracite, glass beads and plastic beads.

7. A system as claimed in claim 1 in which the aeration unit is positioned immediately prior to the fish tank.

8. A fish rearing system in which water can be recycled the system comprising the following components in combination:
  a. a fish tank containing fish and having a recycle water inlet and an outlet;
  b. a first gravitational separator means having an inlet communicating with the outlet of the fish tank, a sludge outlet and a second outlet for recycling water, weir means spaced from said separator inlet means and located in an upper portion of the separator means adjacent the outlet thereof, the separator means being able to remove a substantial proportion of particulate matter from the water coming from the fish tank with low retention time of the water in the separator means and without blinding of the separator means;
  a surge tank having an inlet communicatinng with the second outlet of the separator means, a first outlet for waste and a second oulet;
  d. a pump communicating with the second outlet of the surge tank and having an outlet;
  e. a biological filter communicating with the outlet of the pump, the filter comprising a container having a false floor, an inlet for recycled water above the false floor and an outlet for backwashings above the false floor, an outlet for recycled water, an inlet for backwash air and inlet for backwash water below the false floor;
  f. a particulate filter medium having particles of a size in the range of 0.5 to 10 mm. positioned on the false floor and providing biological water purification sites;
  g. water backwash means whereby backwash water can be forced through the inlet for backwash water in the biological filter and through the particulate medium of the filter, against the recycled flow direction, to clean the medium when required;
  h. air scour means whereby air can be forced through the inlet for backwash air in the biological filter and through the particulate medium of the filter to lift and expand the medium and agitate the medium vigorously to permit adequate backwashing of the medium by the backwash water;
  i. a stilling pond communicating with the outlet for recycled water of the biological filter, the stilling pond having an outlet;
  j. a sump communicating with the outlet of the stilling pond and having an outlet;
  k. a recycle pump communicating with the outlet of the sump;
  l. an aeration unit positioned between the filter outlet for recycled water and the recycled water inlet of the fish tank whereby water in the system can be aerated and stripped of carbon dioxide;
  m. a fresh water inlet in the system; and
  n. conduit means whereby water can be fed throughout the system.

9. A system as claimed in claim 8 in which the gravitational separator means is a settlement tank.

10. A system as claimed in claim 9 in which the settlement tank has a weir adjacent the inlet and a weir adjacent the second outlet, inclined tubes extending from the weir adjacent the second outlet to about half way around the tank and a baffle between the tubes and the weir adjacent the inlet to cause liquid to pass through the tubes to the second outlet.

11. A system as claimed in claim 8 in which the aeration unit is positioned after the recycle pump and before the recycle water inlet of the fish tank.

12. A system as claimed in claim 8 that includes valves enabling the recycle pump to be used to force backwash water through the filter.

* * * * *

UNITED STATES PATENT OFFICE
CERTIFICATE OF CORRECTION

PATENT NO. : 4,043,299
DATED : August 23, 1977
INVENTOR(S) : Alexander E. Birkbeck and Craig C. Walden It is certified that error appears in the above-identified patent and that said Letters Patent are hereby corrected as shown below:

In the data element, item (73), on the front page the entry should appear as follows:

Her Majesty the Queen in the right of the Province of British Columbia, as represented by the Honorable the Minister of Public Works.

This Certificate supersedes Certificate of Correction issued December 20, 1977.

Signed and Sealed this

Seventeenth Day of October 1978

[SEAL]

Attest:

RUTH C. MASON
Attesting Officer

DONALD W. BANNER
Commissioner of Patents and Trademarks